US012644476B2

(12) United States Patent
Blasi et al.

(10) Patent No.: US 12,644,476 B2
(45) Date of Patent: Jun. 2, 2026

(54) MAGNETIC COUPLING PNEUMATIC LINEAR MOTION ACTUATOR

(71) Applicant: Robert A Blasi, Pratt, KS (US)

(72) Inventors: Robert A Blasi, Pratt, KS (US); Teresa K. Blasi, Pratt, KS (US)

( * ) Notice: Subject to any disclaimer, the term of this patent is extended or adjusted under 35 U.S.C. 154(b) by 0 days.

(21) Appl. No.: 18/933,395

(22) Filed: Oct. 31, 2024

(65) Prior Publication Data

US 2025/0052262 A1 Feb. 13, 2025

(51) Int. Cl.
*F15B 15/08* (2006.01)
*F15B 15/14* (2006.01)

(52) U.S. Cl.
CPC ........ *F15B 15/086* (2013.01); *F15B 15/1423* (2013.01); *F15B 15/1433* (2013.01); *F15B 15/1438* (2013.01); *F15B 2211/8855* (2013.01)

(58) Field of Classification Search
CPC .......................... F15B 15/086; F15B 15/1423; F15B 15/1433; F15B 15/1438; F15B 2211/8855
See application file for complete search history.

(56) References Cited

U.S. PATENT DOCUMENTS 3,958,592 A * 5/1976 Wells ...................... F16K 41/02 137/246.22
5,429,035 A * 7/1995 Kaneko ................. F15B 15/086 91/405
6,550,369 B2 * 4/2003 Sato .................... F15B 15/2892 92/128
7,669,515 B2 * 3/2010 Horikawa ............. F15B 15/086 92/88
9,027,461 B2 * 5/2015 Wu ....................... F15B 15/086 92/88
2024/0223061 A1 7/2024 Blasi et al.

FOREIGN PATENT DOCUMENTS

JP H0788843 * 9/1995 ............ F15B 15/086

OTHER PUBLICATIONS

"Airlift Doors, Inc., Owners Manual, Air Operator, Magnaglide"; Airlift Doors, Inc. www.airliftdoors.com.
(Continued)

*Primary Examiner* — Dustin T Nguyen
(74) *Attorney, Agent, or Firm* — Kenneth H. Jack; Davis & Jack, L.L.C.

(57) ABSTRACT

A magnetic coupling pneumatic linear motion actuator incorporating a tube having a longitudinal end and an oppositely longitudinal end; a magnetic piston slidably mounted within the tube; a magnetic sleeve slidably mounted over the tube; longitudinal and oppositely longitudinal shoulders fixedly attached to or formed wholly with the tube, the longitudinal shoulder extending radially inwardly from the tube's longitudinal end, and the oppositely longitudinal shoulder extending radially outwardly from the tube's oppositely longitudinal end; a longitudinal end cap positioned at the tube's longitudinal end, the longitudinal end cap being adapted for releasable attachment to the longitudinal shoulder; and an oppositely longitudinal end cap positioned at the tube's oppositely longitudinal end, the oppositely longitudinal end cap being adapted for releasable attachment to the oppositely longitudinal shoulder.

14 Claims, 10 Drawing Sheets

(56) References Cited

OTHER PUBLICATIONS

"Airlift Install Guide, Magnaglide Air Opener, Magnaglide Air Opener, Horizontal Mount"; Airlift Doors, Inc. www.airliftdoors.com.
"Airlift Doors, Inc., Magnaglide Air Opener"; Airlift Doors, Inc. www.airliftdoors.com.
"Airlift Doors, 2" Magnaglide Air Opener"; Airlift Doors, Inc. www.airliftdoors.com.
"Airlift Doors, Magnaglide Door Operator—Horizontal"; Airlift Doors, Inc. www.airliftdoors.com.
"Airlift Doors, Magnaglide Door Operator—Vertical"; Airlift Doors, Inc. www.airliftdoors.com.
"Magnaglide Air Operator Vertical Mount, Install Guide, Trouble Shooting Guide, Maintenance Manual"; Airlift Doors, Inc. www.airliftdoors.com.

* cited by examiner

MAGNETIC COUPLING PNEUMATIC LINEAR MOTION ACTUATOR

FIELD OF THE INVENTION

This invention relates to magnetic coupling pneumatic linear motion actuators. More particularly, this invention relates to such linear motion actuators which incorporate a hollow bored tube, a magnetic piston slidably mounted within the tube, and a magnetic sleeve slidably mounted over such tube.

BACKGROUND OF THE INVENTION

Commonly known and commonly configured magnetic coupling pneumatic linear motion actuators lack any means for accessing the actuator's interior magnet adapted piston in the event such piston becomes seized in place or is in need of repair or replacement.

The instant inventive magnetic coupling pneumatic linear motion actuator solves or ameliorates such problems and deficiencies of commonly known magnetic coupling pneumatic linear motion actuators by providing specially configured shoulders and end caps at opposite ends of the actuator. Such shoulders extend oppositely with respect to each other, with one shoulder extending radially outwardly, and with the other shoulder extending radially inwardly.

The invention's radially outwardly extending shoulder facilitates mounting of an end cap whose removal exposes the entire inside diameter of the tube to facilitate piston insertions and extractions. The invention's radially inwardly extending shoulder allows the formation at the opposite end of the actuator of a push rod passage port which is closed by a removable end cap. Such radially inwardly extending shoulder eliminates any radially outwardly protruding structure which would interfere with sliding installations and deinstallations of the actuator's magnetic sleeve.

BRIEF SUMMARY OF THE INVENTION

A first structural component of the instant inventive magnetic coupling pneumatic linear motion actuator comprises a substantially ridged tube having a longitudinal end and having an oppositely longitudinal end. To facilitate magnetic coupling via radially emanating magnetic flux, the tube's wall is preferably both thin and non-magnetic. The non-magnetic character of the invention's tube component advantageously establishes the radial thickness dimension of the tube's wall as a magnetically neutral or non-magnetic "air gap".

To maximize the magnetic attraction between an interior magnetic piston and an exterior magnetic slide sleeve, the tube's wall thickness is preferably minimized. While tube wall materials such as plastic, copper, brass, and aluminum may satisfy the required non-magnetic "air-gap" characteristic of the tube, utilization of such materials to form the thin wall of the tube undesirably results in insufficient structural rigidity, causing the tube to bow or buckle.

Satisfaction of both the thin wall characteristic and non-magnetic wall characteristic of the actuator's tube often requires that the tube be composed of durable and strong non-magnetic stainless steel. However, a follow-on problem associated with the provision of a thin-walled stainless-steel tube is recognized upon a fabricator's attempt to cut female or male helical screw threads at the ends of the tube for the purpose of installation of a removably attachable end caps. The formation of such screw threads at the ends of such stainless steel tubes often fails because the thin wall character of such tube interferes with proper tap and die thread cutting. "V" channel helical threads cut at the ends of such thin walled stainless-steel tubes extends multiple channels through a major portion of the tube's wall thickness, undesirably degrading the structural integrity of the tube.

The inability of thin-walled stainless-steel pneumatic actuator tubes to receive sufficiently deep and strong helical threads tends to complicate a needed adaptation of prior art magnetic coupling pneumatic linear motion actuators to include releasably attached end caps. Such defect interferes with provision of mechanical access to the tube's interior magnetic piston when repairs are needed. As a result of such design challenges, known magnetic coupling pneumatic linear motion actuators commonly permanently seal their magnetic pistons within their tubes, and provide no means of access to the magnetic piston for repairs. Such defects undesirably require wasteful replacements of an entire tube when the interior magnetic piston is in need of maintenance or repair.

The instant invention advantageously and beneficially solves and ameliorates such problems by facilitating an insertion of a push rod through an end cap and into the actuator's tube for dislodging a stuck or seized magnetic piston. The instant invention enables such push rod insertions by providing specially configured shoulders and specially configured end caps associated with the shoulders at opposite ends of the actuator's pneumatic tube.

The instant invention recognizes that extraction of the actuator's magnetic piston from one of the ends of the actuator's tube requires that that end of the tube's bore be unobstructed. However, the tube's piston extraction end must be removably capped, requiring the provision of a cap mounting surface which extends radially outwardly from the tube's bore.

The instant invention also recognizes that a sliding deinstallation of the actuator's magnetic sleeve cannot be performed at the actuator's magnetic piston extraction end because the radially outwardly extending cap mounting surface at that end of the tube mechanically interferes with sliding deinstallation of the magnetic sleeve. Accordingly, the sliding deinstallation of the magnetic sleeve must occur at the opposite end of the actuator's tube.

The instant invention also recognizes that provision of such another removable cap at the sleeve deinstallation end of the tube will allow, upon cap removal, a push rod to be inserted into the tube to drive the magnetic piston toward the tube's piston extraction end. However, the mounting surface upon which such another removable cap is mounted cannot extend radially outwardly from the tube's bore, because any radially outward extension of the such mounting surface would mechanically interfere with sliding deinstallation of the magnetic sleeve.

The instant invention avoids the above-described mechanical interferences with magnetic piston extraction and with magnetic sleeve deinstallation by providing a pair of annularly extending shoulders which are fixedly attached to or formed wholly with the tube's ends. One of such shoulders extends radially inwardly from the tube's longitudinal end, while the other shoulder extends radially outwardly from the tube's oppositely longitudinal end. Removable end caps which are mounted upon such shoulders advantageously permit magnetic piston extraction at the tube's oppositely longitudinal end while permitting both a push rod insertions and magnetic sleeve deinstallations at the tube's longitudinal end.

Accordingly, objects of the instant include the provision of a magnetic coupling pneumatic linear motion actuator which incorporates structures as described above and which arranges those structures in relation to each other in the manners described above for the performance of useful functions as described above, other and further objects, benefits, and advantages of the instant invention will become known to those skilled in the art upon review of the detailed description which follows, and upon review of the appended drawings.

DETAILED DESCRIPTION OF THE INVENTION

Figure 1:
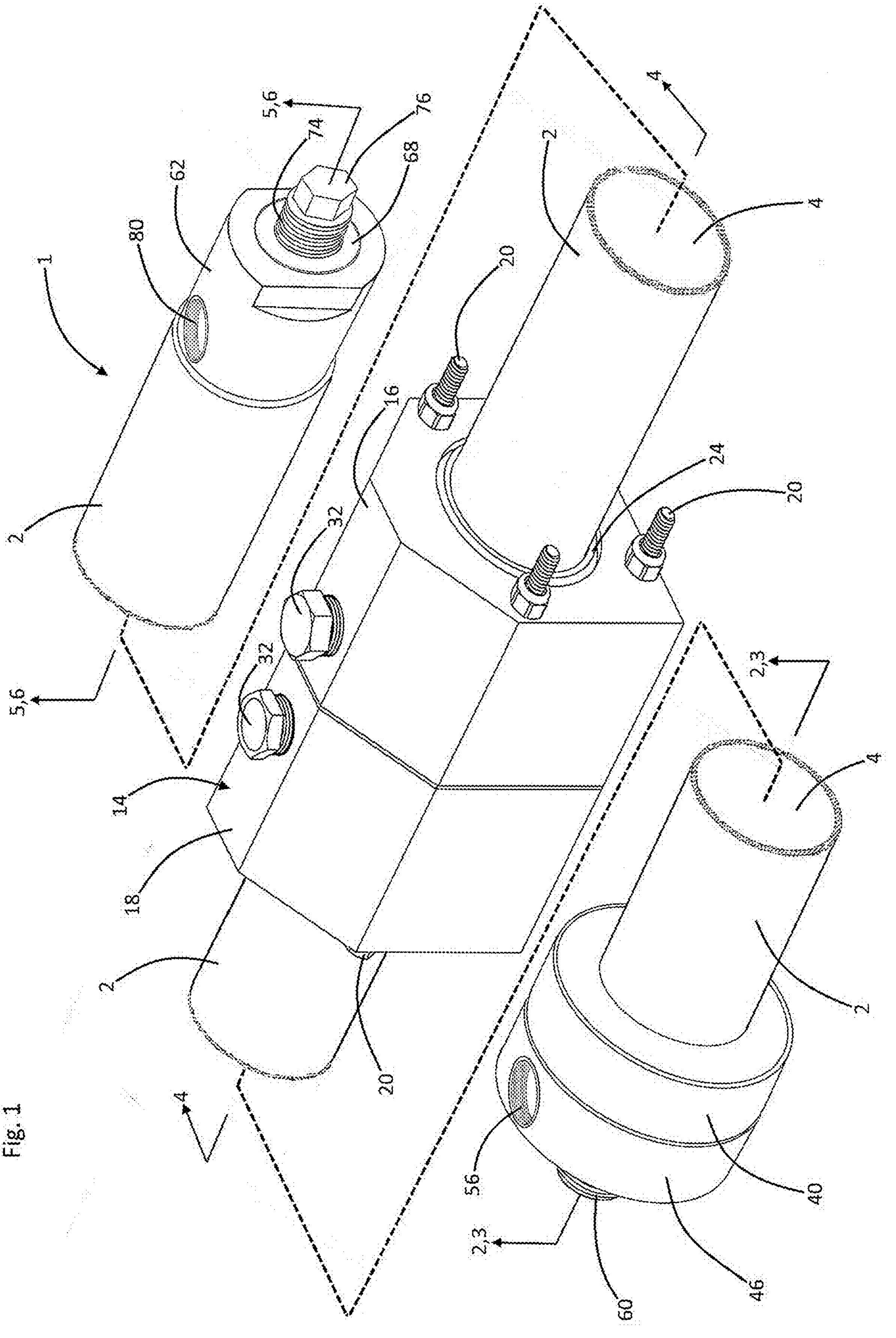
FIG. 1 is a perspective view of a preferred embodiment of the instant inventive magnetic coupling pneumatic linear motion actuator.

Referring now to the drawings, and in particular to FIG. 1, a preferred embodiment of the instant inventive magnetic coupling pneumatic linear motion actuator is referred to generally by reference arrow 1. The actuator 1 comprises a longitudinally elongated tube 2 which is preferably composed of non-magnetic stainless-steel.

Figure 4:
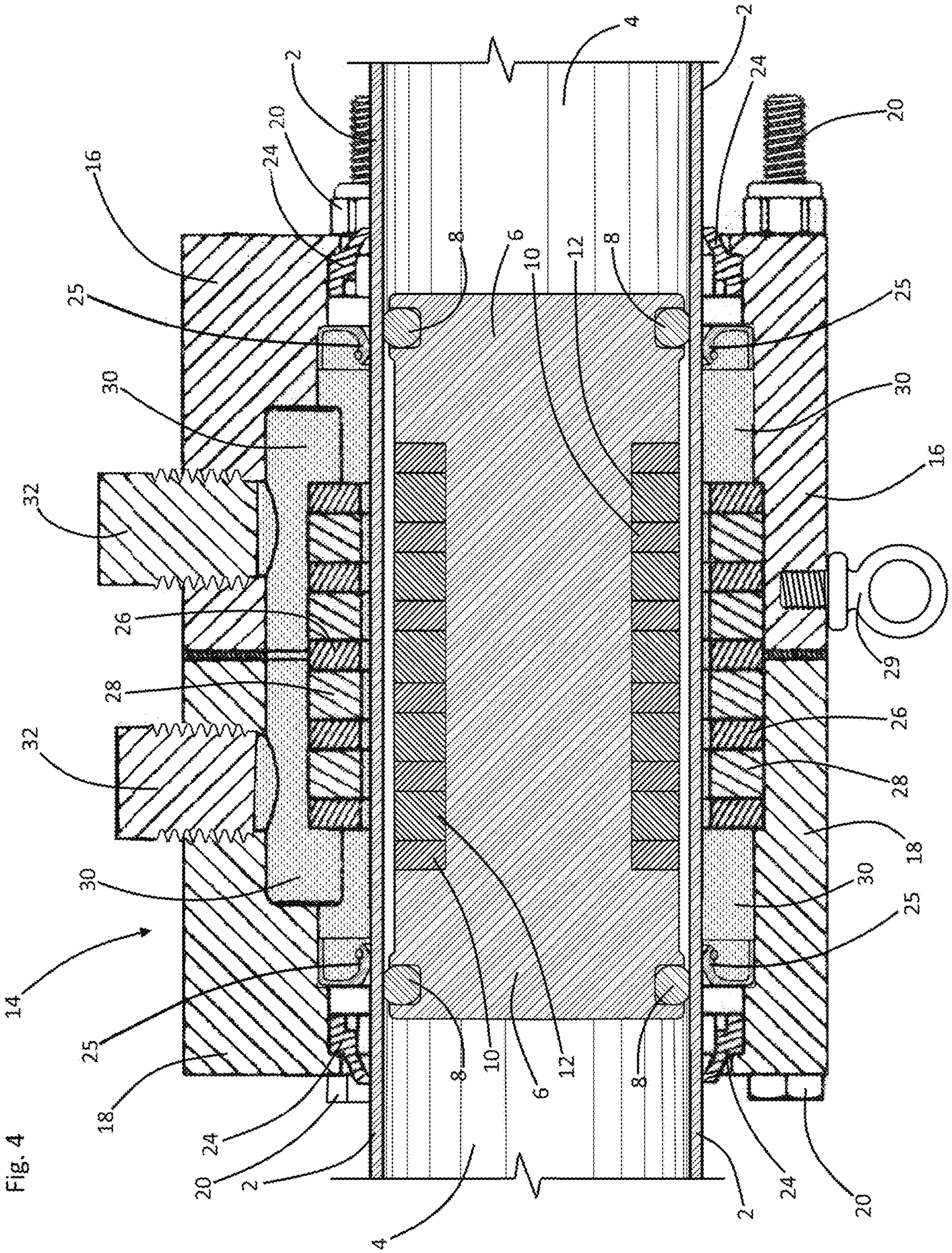
FIG. 4 is a further alternative partial section view, as indicated in FIG. 1.

Referring simultaneously to FIGS. 1 and 4, a magnetic piston 6 is slidably mounted within the hollow bore 4 of the tube 2. In a preferred embodiment, the magnetic piston 6 is equipped with annular air sealing "O" rings 8. Such "O" rings operatively require that compressed air injected into the bore 4 at one end of the tube 2 drives the piston along the tube 2. Ring configured permanent magnets 10 and magnetically permeable pole pieces 12 are embedded within and extend annularly about the piston 6. Such magnets and pole pieces are preferably arranged in a " . . . . N, S, pole piece, S, N, pole piece, N, S, pole piece, S, N, pole piece, N, S . . . " magnetic polar series wherein the magnets' polar axes extend longitudinally. Such arrangement of magnets and pole pieces advantageously heightens the strength of the magnetic fields which emanate radially outwardly from the ring configured pole pieces 12. Other configurations of permanent magnets which may be affixed to a sliding piston component are considered to fall within the scope of invention.

A further structural component of the instant inventive actuator comprises a magnetic sleeve which is slidably mounted about and extends annularly over the tube 2. As shown in FIG. 4, a preferred embodiment of the instant invention's magnetic sleeve component is referred to generally by reference arrow 14. A suitably provided magnetic sleeve component is also disclosed and described in U.S. Patent Application Publication No. 2024/0023061, Published Jul. 4, 2024, Titled "Magnetic Coupling Assembly"; Inventor Blasi. Notwithstanding, other configurations of magnetic sleeves which may be slidably mounted over the instant invention's tube component are considered to fall within the scope of the invention.

The preferred magnetic sleeve 14 comprises longitudinal and oppositely longitudinal sleeve halves 16 and 18 which are rigidly interconnected by longitudinally extending bolt fasteners 20. Longitudinal and oppositely longitudinal wiper seals 24 extend annularly about the tube 2, while inwardly mounded longitudinal and oppositely longitudinal hydraulic seals 25 facilitate continuous lubrication for the prevention of fouling and jamming of the sleeve 14. The hydraulic seals 25 hermetically seal an annulus or reservoir 30 which surrounds the tube 2, such annulus 30 retaining a volume of hydraulic fluid which continuously lubricates sliding contact points between the magnetic sleeve 14 and the tube 2.

A longitudinally extending series of radially outer ring magnets 26 and magnetically permeable pole pieces 28 is supported at the radially inner periphery of the sleeve. In the preferred embodiment the sleeve's magnets and pole pieces are arranged similarly with the piston's magnets and pole pieces 10 and 12.

Intense magnetic fields emanating radially inwardly from magnets and pole pieces 26 and 28 and emanating radially outwardly from magnets and pole pieces 10 and 12 establish a non-mechanical locked juncture between the magnetic sleeve 14 and the magnetic piston 6. As the piston 6 is driven longitudinally or oppositely longitudinally along the hollow bore 4 of the tube 2, such magnetically locked connection between the sleeve 14 and the piston 6 required that the sleeve travel along the tube 2 with the magnetic piston 6. An equipment mounting bracket or fastener such as a threadedly mounted eye 29 attached to the undersurface of the sleeve 14 may be operatively connected to a workpiece which is operatively moved by the actuator 1. A typical example of such workpiece is a garage door (not depicted within views).

In the preferred embodiment, the outside diameter of the tube 2 is substantially equal to the effective inside diameter of the magnetic sleeve 14 at the inner peripheries of its wipers 24 and hydraulic seals 25. Correspondingly, the effective outside diameter of the magnetic piston 6 at the radially outer peripheries of the "O" ring seals 8 is substantially equal to the inside diameter of the tube 2.

Figure 5:
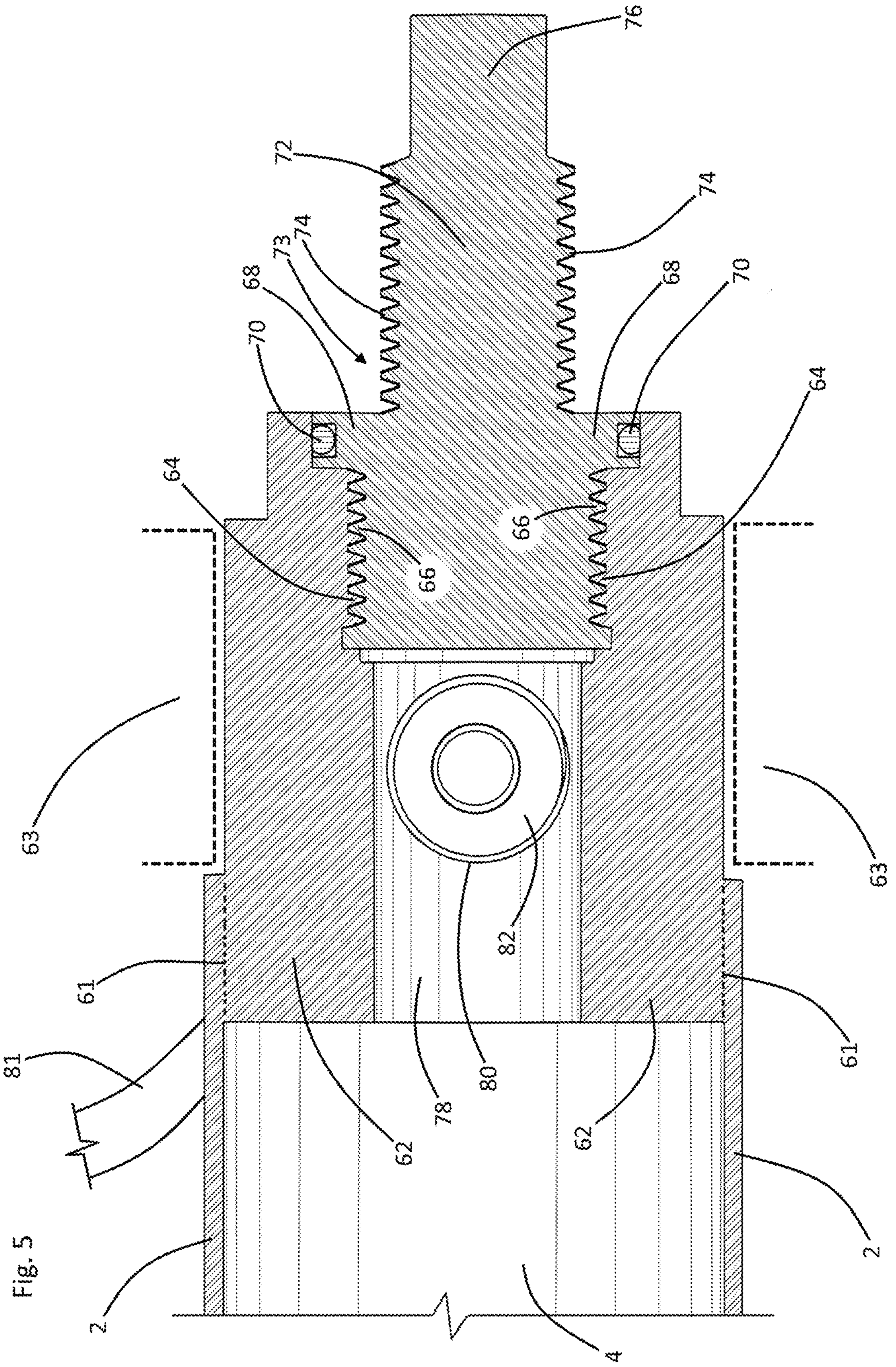
FIG. 5 is a further alternative partial section view, as indicated in FIG. 1.

Referring simultaneously to FIGS. 1 and 5, the instant inventive linear motion actuator preferably further comprises a longitudinal shoulder 62, which is fixedly attached to or formed wholly with the longitudinal end of the tube 2. Such fixed attachment is denoted by dashed line 61. In a preferred embodiment, such fixed attachment constitutes a welded connection between the tube 2 and the longitudinal shoulder 62. Such connection 61 may suitably alternatively comprise a wholly formed joint or an adhesively bonded joint.

Figure 2:
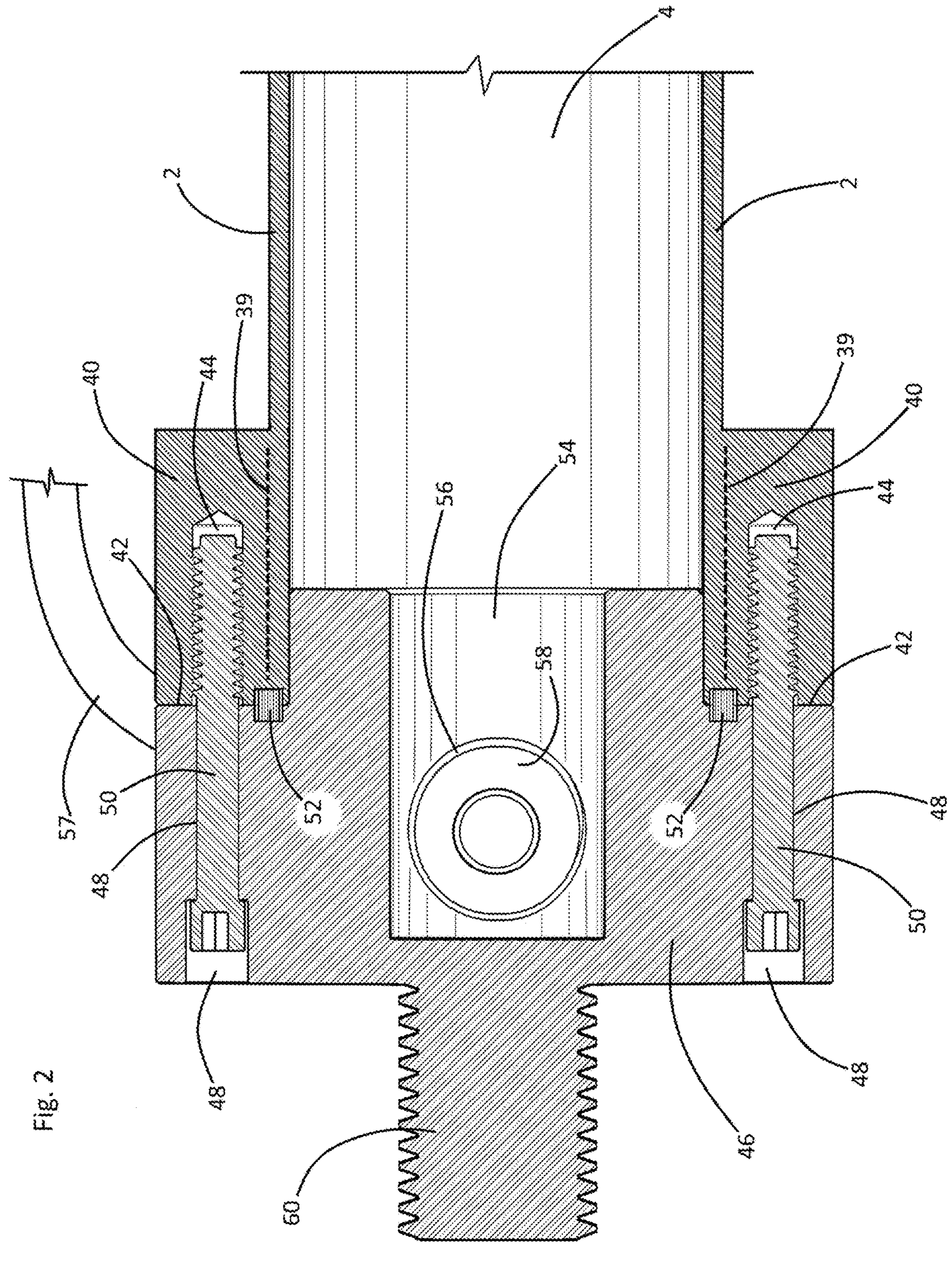
FIG. 2 is a partial section view as indicated in FIG. 1.
Figure 3:
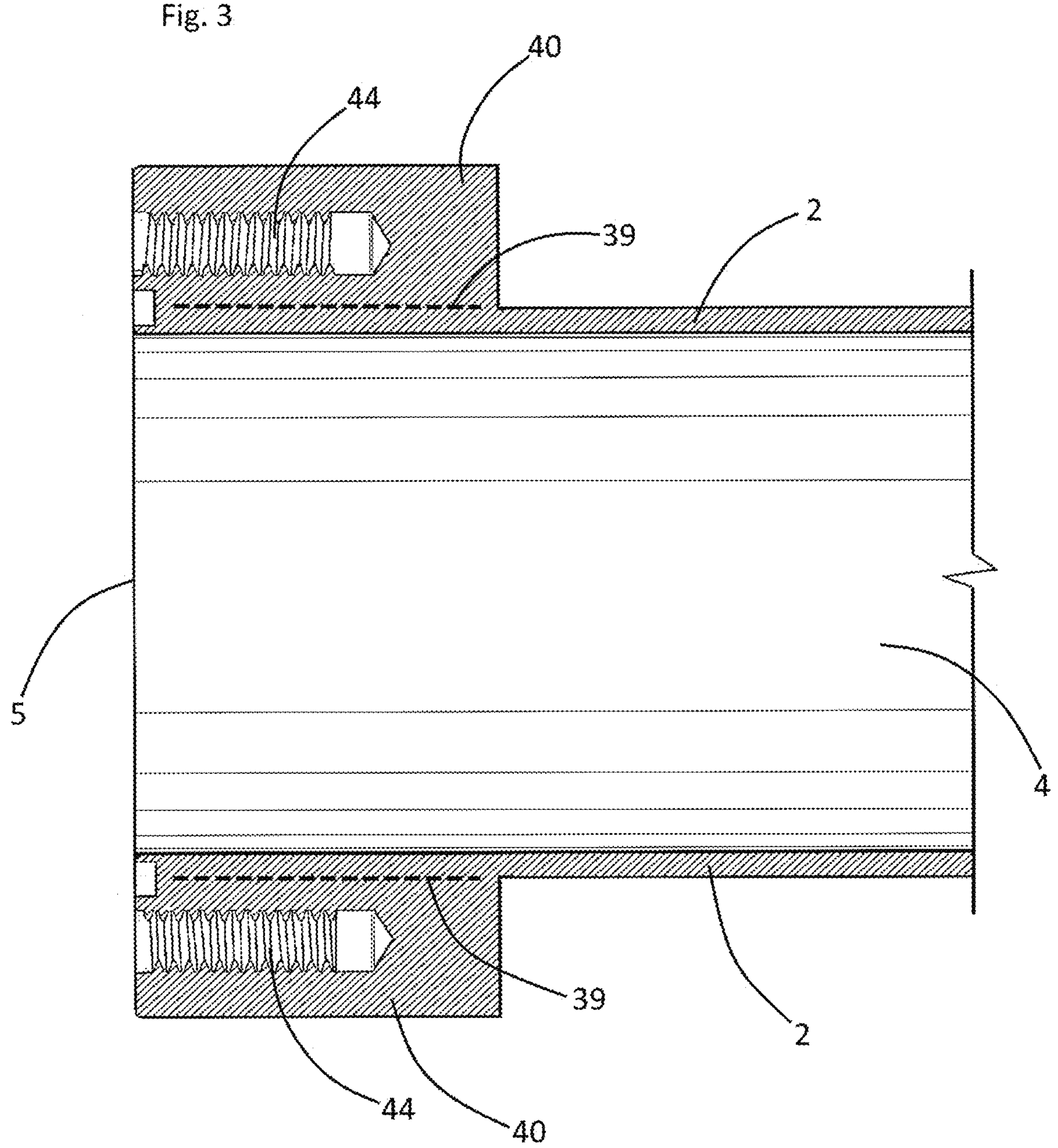
FIG. 3 is an alternative partial section view, as indicated in FIG. 1.

As shown in FIG. 5, the actuator's longitudinal shoulder component extends annularly about the inner periphery of the tube 2, and extends radially inwardly from such periphery. Correspondingly, referring further to FIGS. 1 and 2, the instant inventive actuator further comprises an oppositely longitudinal shoulder 40 which is fixedly attached to for formed wholly with the oppositely longitudinal end of the tube 2. Such oppositely longitudinal shoulder 40 oppositely extends radially outwardly from the tube 2. Dashed line 39 drawn upon FIG. 2 represents a preferred welded attachment of the oppositely longitudinal shoulder 40 to the tube 2. Such attachment 39 may suitably alternatively comprise an adhesively bonded joint or a wholly formed joint.

The inventive linear motion actuator further comprises a longitudinal end cap which is referred to generally by reference arrow 73. In the preferred embodiment, the longitudinal end cap 73 is positioned at the longitudinal end of the tube 2, such cap being adapted for releasable attachment to the tube's longitudinal shoulder 62. In a preferred embodiment, such releasable attachment comprises a combination of male 66 helical threads which extend radially outwardly from the end cap 73 in mating combination with female helical threads 64 which extend radially inwardly from the radially inner periphery of the longitudinal shoulder 62.

In a preferred embodiment, the longitudinal end cap 73 presents an annular flange 68, which supports an air sealing "O" ring 70. Upon application of a wrench to the longitudinal end cap's hexagonal head 76, wrench actuated turning and counter turning may install or deinstall the end cap 73 upon and from the longitudinal shoulder 62.

While the longitudinal end of the longitudinal shoulder 62 is adapted to facilitate releasable attachment of the longitudinal end cap 73, the oppositely longitudinal end of such shoulder preferably forms a hollow push rod receiving port or channel 78, the function of which is described below.

Referring simultaneously to FIGS. 1 and 2, the instant inventive linear motion actuator preferably further comprises an oppositely longitudinal end cap 46, which is positioned at the oppositely longitudinal end of the tube 2. The oppositely longitudinal end cap 46 is adapted for releasable attachment to the oppositely longitudinal shoulder 40. In the preferred embodiment depicted in FIG. 2, the releasable attachment adaptation incorporates an oppositely longitudinal array of fastener receiving apertures or channels 48 in combination with a matching longitudinal array of fastener receiving apertures or channels 44. Upon alignment of the apertures 48 and 44, a plurality of bolt fasteners 50 may be received within and may extend therethrough. Screw tightening of the bolts 50 causes the oppositely longitudinal cap 46 to be securely mounted against the oppositely longitudinal end 42 of the oppositely longitudinal shoulder 40. An air sealing "O" ring 52 is preferably interposed between the cap 46 and the shoulder 40.

In operation of the instant inventive magnetic coupling pneumatic linear motion actuator 1, and referring simultaneously to FIGS. 1-6, a compressed air line 57 having a screw fastenable adaptor 58 may be securely connected in communication with an air passage port 56 which extends through cap 46. Correspondingly, a second compressed air line 81 having a helically threaded adaptor 82 may be fixedly attached to air passage port 80 which extends through the longitudinal shoulder 62. Upon injection of compressed air into the air line 57, the air emits from port 56 into channel 54 within the oppositely longitudinal end cap 46. The compressed air then fills the oppositely longitudinal end of the tube 2, and drives piston 6 longitudinally within the tube's hollow bore 4. Such compressed air actuated motion of the piston 2 magnetically carries the magnetic sleeve 14 and carries an attached workpiece such as a garage door which may be mechanically linked to the sleeve 14 via an attachment bracket or fastener 29. An alternative injection of compressed air into air line 81 for emission from port 80 into air channel 78 passes oppositely longitudinally to oppositely drive the piston 6 and magnetic sleeve 14, along with such attached garage door workpiece.

Figure 6:
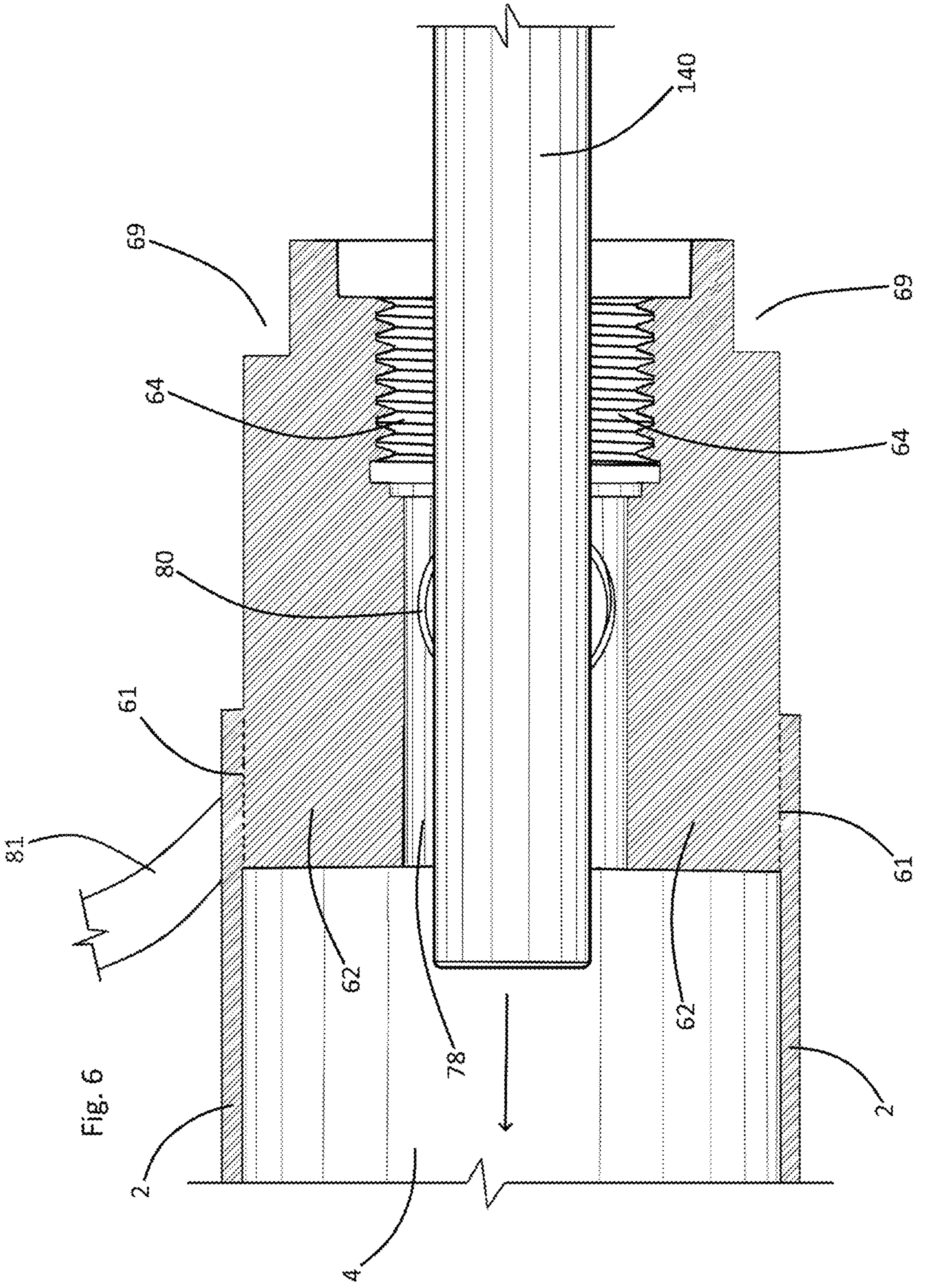
FIG. 6 presents an alternate configuration of the structure of FIG. 5.

The magnetic piston may, upon occasion, become mechanically seized or stuck within the hollow bore of the tube 2. Upon such seizure of the magnetic piston 6, an operator may apply a wrench to the hexagonal head 76 of the longitudinal end cap 73, and may turn such end cap counter clock wise to unscrew and uninstall the longitudinal end cap 73. Thereafter, as indicated in FIG. 6, the operator may insert a rigid push rod 140 through the channel 78 which is formed by and radially inwardly underlies the radially inner end of the longitudinal shoulder 62. A further oppositely longitudinal extension of the push rod 140 within and through the channel 78 and into bore 4 may cause the oppositely longitudinally end of the push rod 140 to impinge against the longitudinal end of the magnetic piston 6. Such impinging contact against the magnetic piston 6 may advantageously drive the magnetic piston to the extreme oppositely longitudinal end of the tube 2, such end functioning as an unobstructed piston output port 5. Upon deinstallation of the oppositely longitudinal end cap 46 by means of extraction of mounting bolts 50, the magnetic piston 6 may be driven completely out of and removed from the tube 2. Since the end cap mounting oppositely longitudinal shoulder 40 exclusively extends radially outwardly from the tube 2, such shoulder advantageously avoids any presentation of any structure which might interfere with push rod driven extraction of the magnetic piston 6. Upon extraction and removal of the magnetic piston 6 from the oppositely longitudinal port 5, maintenance and repairs upon such piston may be performed. Thereafter, the piston 6 may be reinserted and driven longitudinally into and through the port 5.

To facilitate similar maintenance of the magnetic sleeve 14, the air line attachment adapter 82 may be threadedly removed from port 80. Thereafter, one of the hydraulic fluid plugs 32 may be unscrewed and removed from the sleeve 14, allowing the hydraulic fluid within sleeve annulus 30 may be drained. Thereafter, the magnetic sleeve may be slidably moved longitudinally along the tube 2 until such sleeve reaches the tube's extreme longitudinal end. The exclusively radially inward extension of the longitudinal shoulder 62 assures that no end cap mounting structure interferes with sliding removal of the magnetic sleeve 14. The exclusively radially inward extension of the longitudinal shoulder 62 effectively forms a radially outwardly extending annulus 63 through which the magnetic sleeve 14 may freely pass. In the preferred embodiment, the inside diameter of the annulus 63 is less than the outside diameter of the tube 2, such differential in diameters assuring that the entirety of the magnetic sleeve 14 may pass longitudinally through such annulus 63.

Upon a sliding longitudinal removal of the magnetic sleeve 14, maintenance and repairs may be performed. Thereafter, the magnetic sleeve may be reinstalled by oppositely longitudinally sliding the magnetic sleeve 14 over the outer periphery of the longitudinal shoulder 62 and over the longitudinal end of the tube 2.

Figure 8:
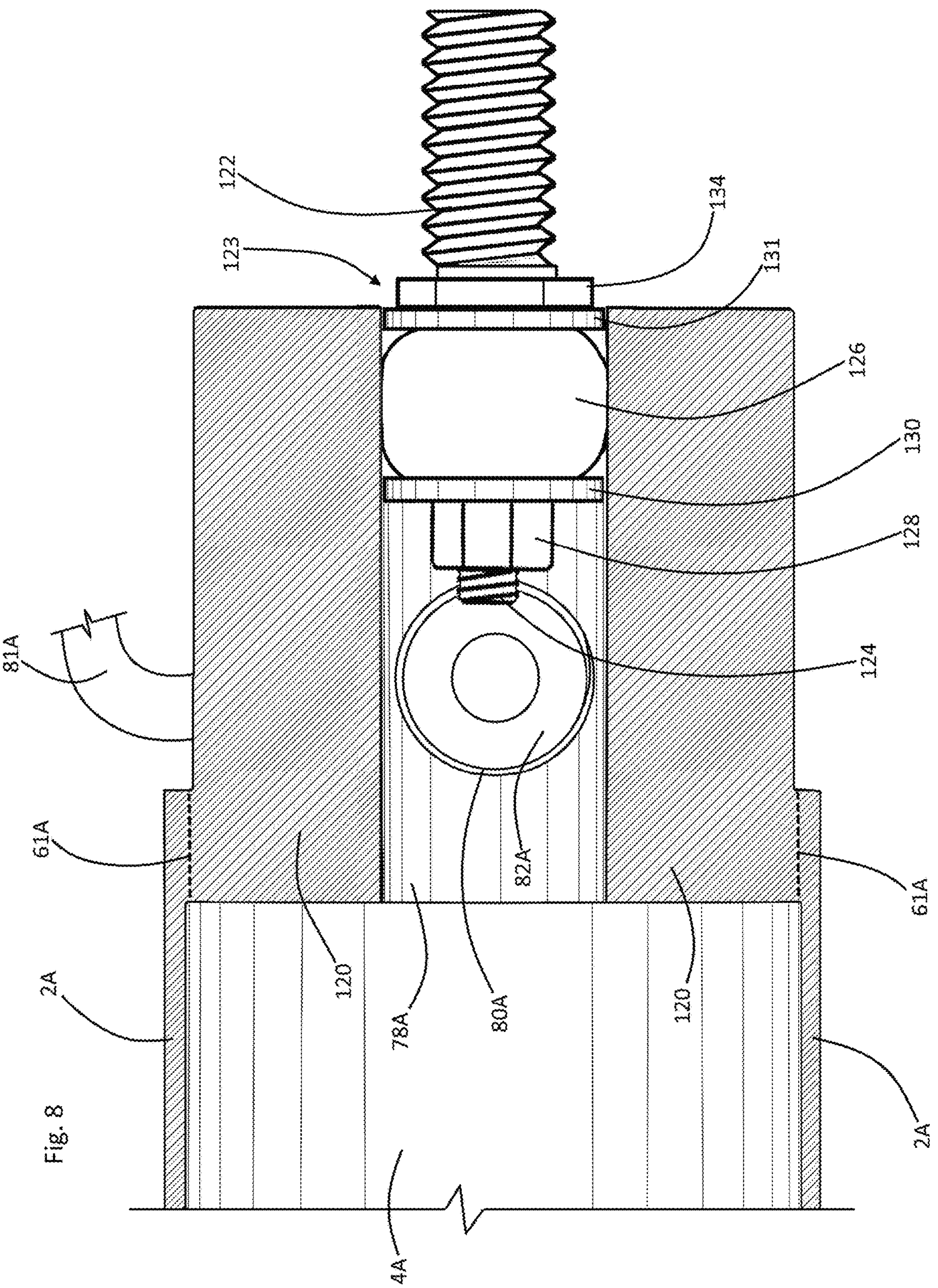
FIG. 8 presents a second alternate configuration of the structure of FIG. 5.

Referring to FIG. 8, all structures identified by a reference numeral having a suffix "A" are configured similarly with similarly numbered structures appearing in FIG. 5. In the FIG. 8 structural alternative an inwardly extending longitudinal shoulder 120 forms a radially inner smooth walled channel 78A which omits the female helical threads 64 of the FIG. 5 configuration of longitudinal shoulder 62. In the FIG. 8 alternative configuration, a pressure fitted longitudinal end cap 123 comprises an elastomeric expansible sleeve or cylinder 126 and washers 130 and 131 which are mounted in the depicted series over a screw shaft 124. A helically threaded nut 128 may be fixed upon washer 130 so that, upon wrench actuated screw turning applied to hexagonal lands 134, the screw shaft 124 draws washers 130 and 131 together, compressing the expansible sleeve 126 and compressively radially outwardly driving such sleeve against the cylindrical wall of channel 78A. Upon reversal of such installation steps, the alternatively configured pressure fitted end cap 123 may be removed, and the push rod 140 may be inserted oppositely longitudinally therethrough.

Figure 7:
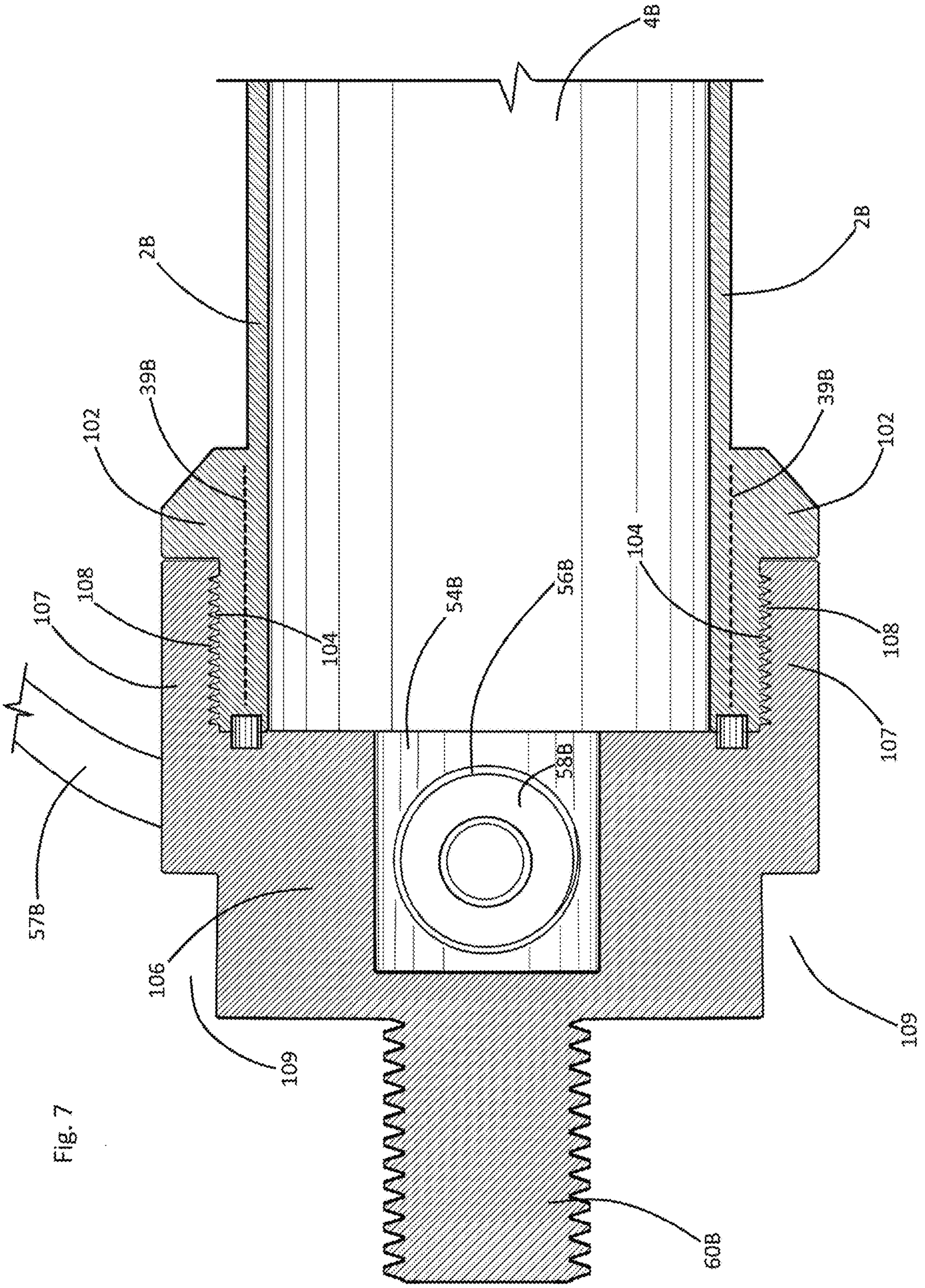
FIG. 7 presents an alternate configuration of the structure of FIG. 2.

Referring simultaneously to FIGS. 2 and 7, all structures identified by a reference numeral having a suffix "B" are configured similarly with similarly numbered structured appearing in FIG. 2. In the FIG. 7 structural alternative, an alternatively configured oppositely longitudinal end cap 106 is provided, such end cap presenting an annular wall 107, having radially inwardly extending female helical threads 108. An alternatively configured oppositely longitudinal shoulder 102 is attached to the oppositely longitudinal end of the tube 2B by means of a joint 39B which may comprise a wholly formed joint, a weld, or an adhesive bond. The radially outer periphery of such alternative shoulder 102 presents male helical threads 104 which are closely fitted to and which engage female helical threads 108. Lands 109 are preferably provided so that, upon engagement of such lands with a wrench, the alternatively configured oppositely longitudinal end cap 106 may be installed and deinstalled by turning and counter turning the helical thread 104 and 108.

Figure 10:
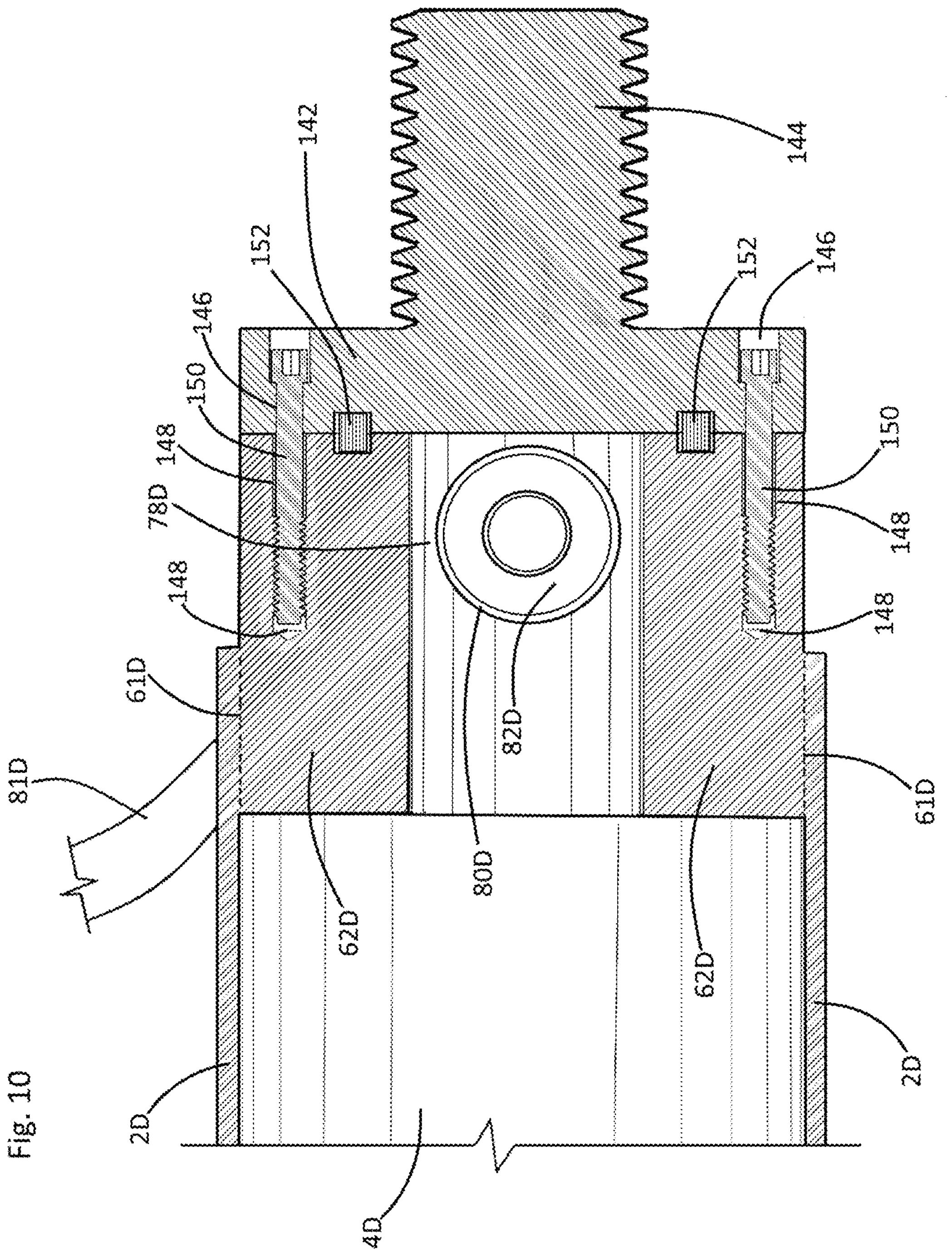
FIG. 10 presents a third alternative configuration of the structure of FIG. 5.

Referring simultaneously to FIGS. 5 and 10, all structures appearing in FIG. 10 which are identified by a reference numeral having a suffix "D" are configured similarly with similarly numbered structures appearing in FIG. 5. In the FIG. 10 structural alternative, an alternatively configured end cap 142 replaces end cap 73 of the FIG. 5 configuration. Fastener receiving apertures or channels 146 and 148 are provided within the end cap 142 and within the radially inwardly extending shoulder 62D, such apertures receiving helically threaded bolt fasteners 150. Upon tightening of bolts 150, the alternate longitudinal end cap 142 is compressively drawn against the longitudinal end of the longitudinal shoulder 62D, compressively engaging an annular air seal 152. In the FIG. 10 alternative configuration, the outside diameter of the longitudinal shoulder 62D and the outside diameter of the end cap 142 are less than the outside diameter of the tube 2D, such diameter deferential allowing sliding longitudinal removal of the magnetic sleeve 14.

Figure 9:
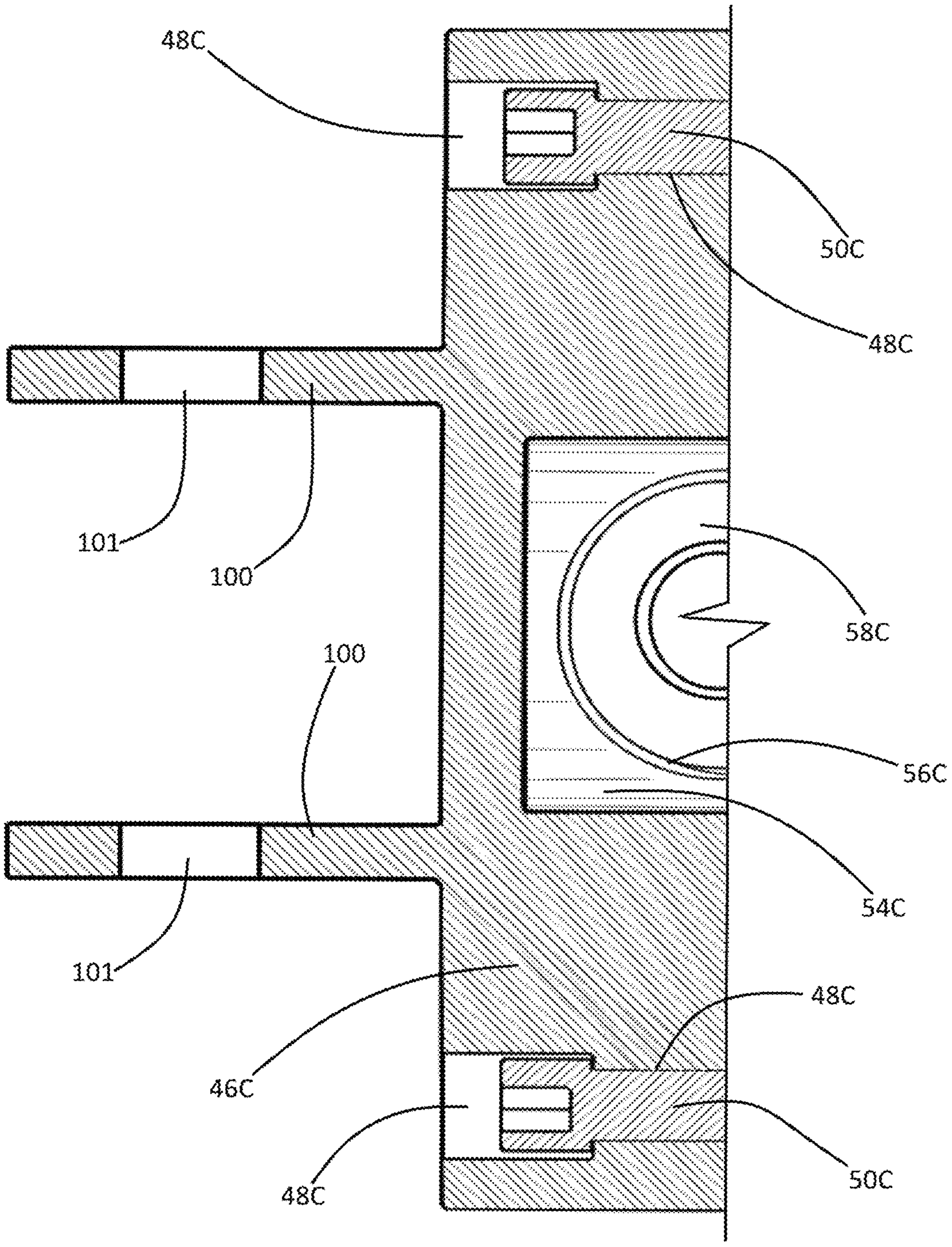
FIG. 9 presents a second alternate configuration of the structure of FIG. 2.

Referring simultaneously to FIGS. 1, 2, 5, 7, 8, and 10, actuator fastening or suspending means are preferably provided, such means being fixedly attached to or formed wholly with the apparatus' end cap components. Helically threaded lugs 60 and 74 which respectively extend oppositely longitudinally and longitudinally from the oppositely longitudinal and longitudinal end caps 46 and 73 may engage helically threaded sockets presented within actuator mounting brackets (not depicted within views). Referring in particular to FIG. 9, all structures identified by a reference numeral having the suffix "C" are configured similarly with similarly numbered structures appearing in FIG. 2. In the FIG. 9 structural alternative, the actuator fastening means may comprise a pair of clevis ears 100 having clevis eyes 101. The helically threaded lugs 60 and 74 and clevises 100 are intended as being representative of other commonly known and commonly configured fastening brackets and components.

While the principles of the invention have been made clear in the above illustrative embodiment, those skilled in the art may make modifications to the structure, arrangement, portions, components, and method steps of the invention without departing from those principles. Accordingly, it is intended that the description and drawings be interpreted as illustrative and not in the limiting sense, and that the invention be given a scope commensurate with the appended claims.

The invention claimed is:

1. A magnetic coupling pneumatic linear motion actuator comprising:

a. a tube having a longitudinal end and an oppositely longitudinal end;

b. a magnetic piston slidably mounted within the tube;

c. a magnetic sleeve and sleeve passage annulus combination, said combination's magnetic sleeve being slidably mounted over the tube;

d. longitudinal and oppositely longitudinal shoulders fixedly attached to or formed wholly with the tube, the longitudinal shoulder extending radially inwardly from the tube's longitudinal end, and the oppositely longitudinal shoulder extending radially outwardly from the tube's oppositely longitudinal end;

e. a longitudinal end cap positioned at the tube's longitudinal end, the longitudinal end cap being adapted for releasable attachment to the longitudinal shoulder;

f. an oppositely longitudinal end cap positioned at the tube's oppositely longitudinal end, the oppositely longitudinal end cap being adapted for releasable attachment to the oppositely longitudinal shoulder;

g. a piston passage port; and h. a push rod passage port, wherein the piston passage port is positioned radially inwardly from the oppositely longitudinal shoulder, wherein the sleeve passage annulus extends radially outwardly from the longitudinal shoulder, and wherein the push rod passage port is positioned radially inwardly from the longitudinal shoulder.

2. The magnetic coupling pneumatic linear motion actuator of claim 1, further comprising male threads extending helically about and extending radially outwardly from the longitudinal end cap.

3. The magnetic coupling pneumatic linear motion actuator of claim 2, further comprising female threads extending helically about and extending radially inwardly from the longitudinal shoulder, the female threads being fitted for engagement with the male threads.

4. The magnetic coupling pneumatic linear motion actuator of claim 1, wherein the longitudinal end cap comprises a plug.

5. The magnetic coupling pneumatic linear motion actuator of claim 1, wherein the oppositely longitudinal end cap's adaptation for releasable attachment comprises oppositely longitudinal and longitudinal arrays of fastener apertures, said arrays of fastener apertures respectively extending into the oppositely longitudinal end cap and into the oppositely longitudinal shoulder.

6. The magnetic coupling pneumatic linear motion actuator of claim 5, further comprising a plurality of fasteners, each fastener extending into one of the fastener apertures among the oppositely longitudinal array of fastener apertures, said each fastener further extending into one of the apertures among the longitudinal array of fastener apertures.

7. The magnetic coupling pneumatic linear motion actuator of claim 1, wherein the magnetic piston has an outside diameter, wherein the piston passage port has an inside diameter, and wherein said diameters are substantially equal to each other.

8. The magnetic coupling pneumatic linear motion actuator of claim 7, wherein the magnetic sleeve has an inside diameter, wherein, the sleeve passage annulus has an inside diameter, and wherein the inside diameter of the sleeve passage annulus is less than or equal to the inside diameter of the magnetic sleeve.

9. The magnetic coupling pneumatic linear motion actuator of claim 8, wherein the push rod passage port has an inside diameter which is less than that of the tube.

10. The magnetic coupling pneumatic linear motion actuator of claim 1, comprising actuator fastening means connected operatively to the longitudinal and oppositely longitudinal end caps.

11. The magnetic coupling pneumatic linear motion actuator of claim 10, wherein the actuator fastening means comprise helically threaded lugs.

12. The magnetic coupling pneumatic linear motion actuator of claim 1, further comprising at least a first air passage port, said port opening at one of the shoulders among the longitudinal shoulder and the oppositely longitudinal shoulder.

13. The magnetic coupling pneumatic linear motion actuator of claim 12, further comprising a second air passage port, said port opening at the other shoulder among the longitudinal and oppositely longitudinal shoulders.

14. The magnetic coupling pneumatic linear motion actuator of claim 1, further comprising at least a first air seal, said air seal operatively spanning between one of the end caps and one of the shoulders.

* * * * *